United States Patent [19]
Grieb

[11] Patent Number: 5,177,957
[45] Date of Patent: Jan. 12, 1993

[54] PROPFAN TURBINE ENGINE

[75] Inventor: Hubert Grieb, Germering, Fed. Rep. of Germany

[73] Assignee: MTU Motoren-Und Turbinen-Union Munchen GmbH, Fed. Rep. of Germany

[21] Appl. No.: 662,442

[22] Filed: Feb. 28, 1991

[30] Foreign Application Priority Data

Mar. 22, 1990 [DE] Fed. Rep. of Germany ....... 4009223

[51] Int. Cl.⁵ .............................. F02K 3/02; B64B 1/24
[52] U.S. Cl. .................................. 60/226.1; 244/53 B
[58] Field of Search ................ 60/226.1, 39.092; 137/15.1, 15.2; 244/53 B

[56] References Cited

U.S. PATENT DOCUMENTS

| | | | |
|---|---|---|---|
| 3,059,878 | 10/1962 | Kerry et al. | 244/53 B |
| 3,222,863 | 12/1965 | Klees et al. | 244/53 B |
| 3,446,223 | 5/1969 | Hancock | 137/15.2 |
| 3,618,876 | 11/1971 | Skidmore et al. | 244/53 B |
| 3,623,494 | 11/1971 | Poucher | 137/15.2 |
| 3,664,612 | 5/1972 | Skidmore et al. | 137/15.2 |
| 4,047,911 | 9/1977 | Krojer | 244/53 B |
| 4,132,240 | 2/1979 | Frantz | 137/15.1 |
| 4,620,679 | 11/1986 | Karanian | 137/15.1 |
| 4,865,268 | 9/1989 | Tracksdorf | 244/53 B |
| 5,014,933 | 5/1991 | Harm et al. | 244/53 B |

FOREIGN PATENT DOCUMENTS

| | | |
|---|---|---|
| 2048588 | 4/1971 | Fed. Rep. of Germany . |
| 2244959 | 4/1973 | Fed. Rep. of Germany . |
| 1228806 | 4/1971 | United Kingdom . |

Primary Examiner—Richard A. Bertsch
Assistant Examiner—Howard R. Richman
Attorney, Agent, or Firm—Evenson, Wands, Edwards, Lenahan & McKeown

[57] ABSTRACT

A propfan turbine engine for an aircraft has a shroud and on the leading edge of the shroud, has one or several, preferably two, separate sector-like annular profile parts which via actuating devices can be moved from the shroud such that slots can be formed between the profile parts and the shroud. This arrangement prevents dangerous air-flow separations on the outside of the upper shroud region and on the inside of the lower shroud region at large angles of attack of the aircraft engine for both high and low power operation.

8 Claims, 2 Drawing Sheets

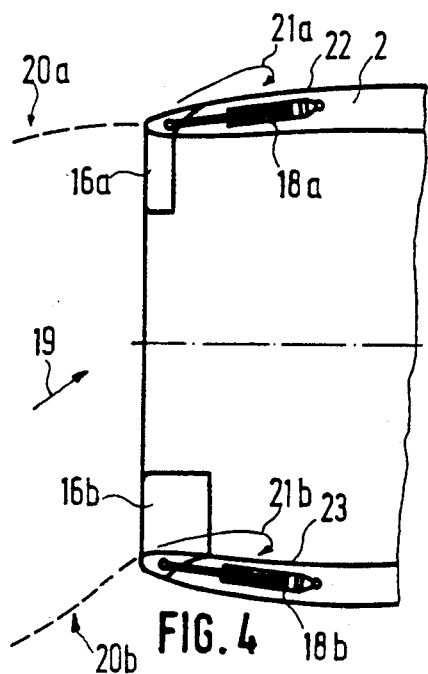
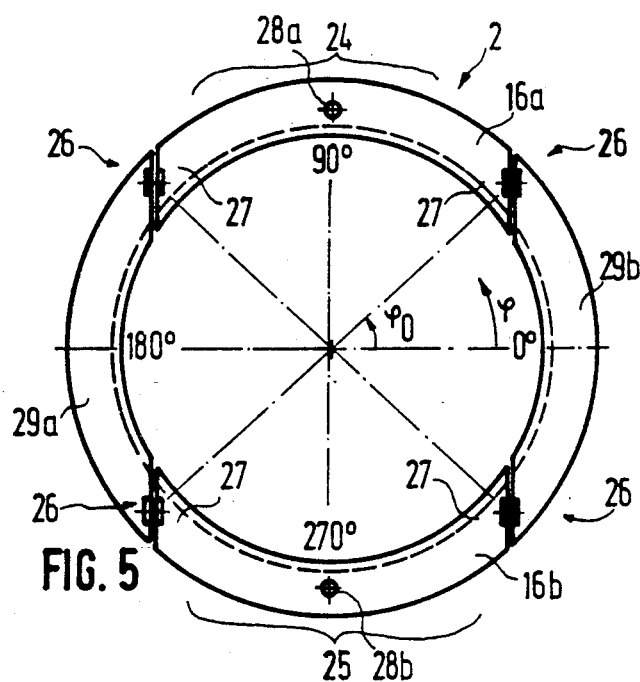
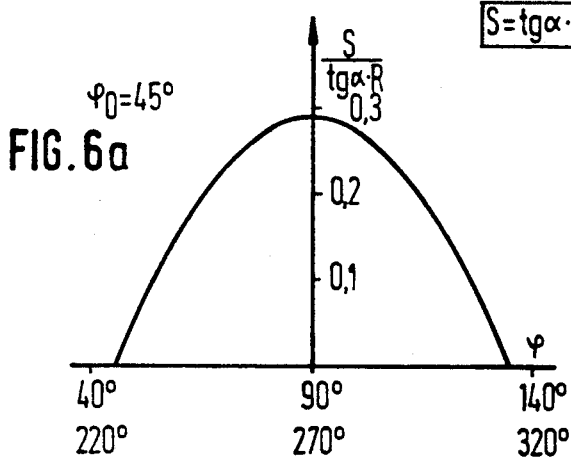
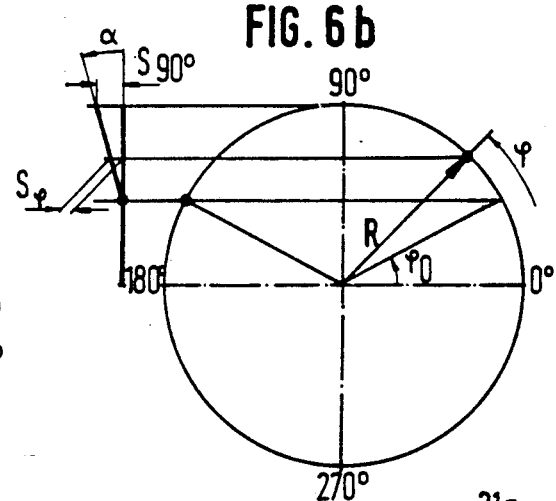
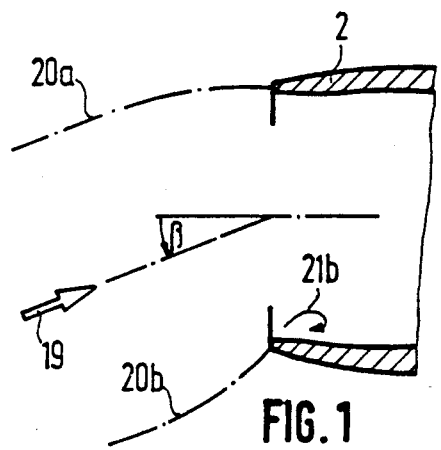
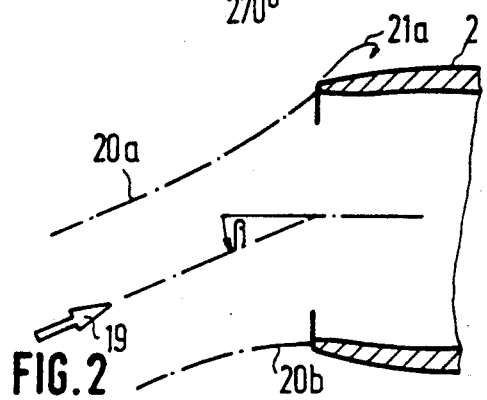

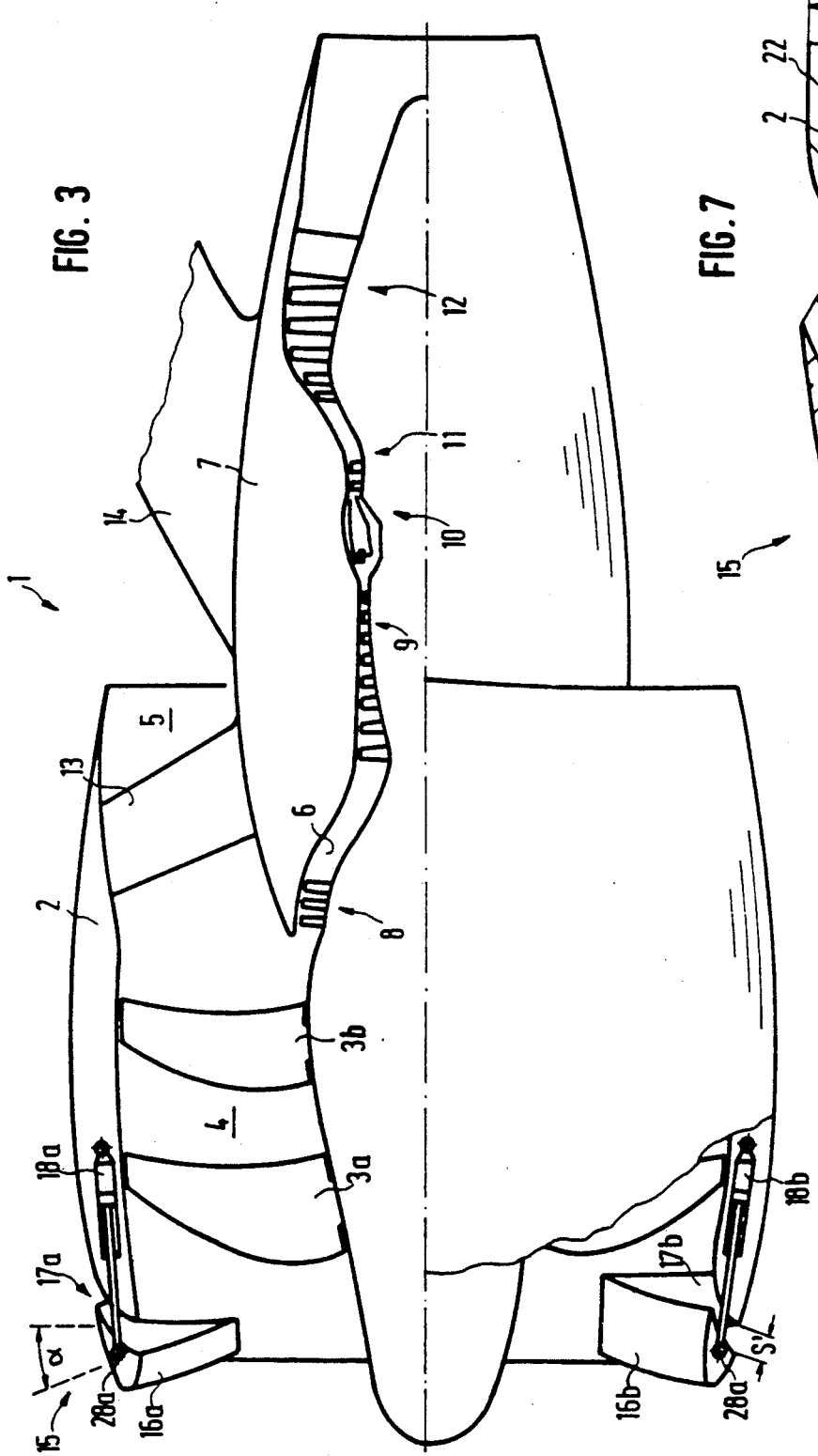
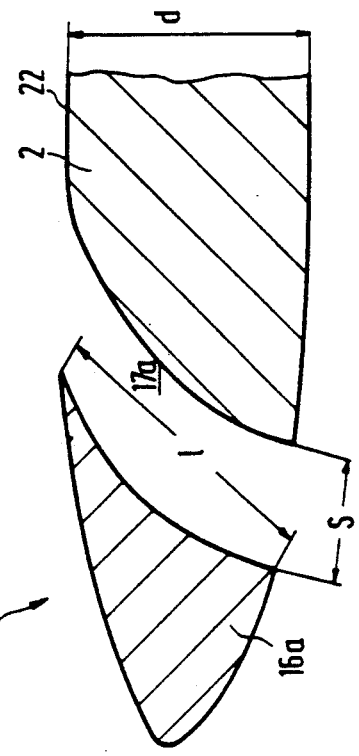

PROPFAN TURBINE ENGINE

BACKGROUND AND SUMMARY OF THE INVENTION

This invention relates to a propfan turbine engine for aircraft and, more particularly, to a propfan turbine engine having a shroud which surrounds the propfan blades. The shroud includes a leading edge which, when viewed with respect to the aircraft, has an upper, annular section designed as a separate profile part and being variable with respect to the shroud via an actuating device.

With known propfan turbine engines, the approximate axial Mach number between the fan entry and exit ranges between 0.75 and 0.78, whereas with conventional turbofan engines the approximate axial Mach number is typically 0.65 at the entry and 0.45 at the exit. With the conventional turbofan the more pronounced deceleration of the oncoming in-flight air flow in its passage through the fan necessitates a substantially more pronounced curvature of the outer contour of the fan shroud, or a larger maximum diameter of the fan shroud relative to the diameter of the oncoming air stream, than with the shrouded propfan.

In the same manner that the slim, aerodynamically clean contour, which can be achieved for at least the counterrotating shrouded propfan, is desirable in normal flight for its low shroud drag, the shrouded propfan is much more sensitive than the shroud contour associated with the conventional turbofan to flow separation at off-design incidence. Still, every effort must be made to prevent flow separations from the shroud inside or outside and at any incidence encountered in flight operation. This holds true at all flight Mach numbers and aircraft angles of attack, and over the entire effective operating range of the engine.

It is especially during takeoff, i.e. during roll and liftoff (rotation), and during climb that incidences in the leading edge area of the shroud may be unfavorable enough to cause flow separations in that area. These separations may occur on both the inside and the outside of the shroud, and also in certain areas, i.e. top or bottom, only or along the entire circumference.

Air flow separations are especially critical and should positively be prevented when occurring in the top position on the outside of the shroud. This is on account of the adverse effect separations have on the approach flow to the wing, which is normally arranged behind that area. This adverse effect occurs at the wide engine or aircraft angles of attack encountered during rotation and climb. Jeopardy attaches also when separation occurs at the bottom position on the inside of the shroud, which is equally critical with respect to the approach flow to the fan.

Solutions which provide variable geometry in the shroud inlet area have been disclosed, e.g. in U.S. Pat. No. 3,446,223, where circumferentially spaced flaps are provided behind the lip to inject air from the outside in an inward/rearward direction. This eliminates separation all around on the shroud inner side so that improvement is only achieved in the rather uncritical flight situation where separation is threatened all around on the inside. In this situation, the fan is inherently capable in a large measure to stabilize the flow at the fan entry.

In another disclosure, the entry portion is designed as an axially movable ring to form an annulus permitting air to flow from the outside in an inward, rearward direction. This second solution accordingly falls in much the same category as that disclosed in U.S. Pat. No. 3,446,223. A design similar to the above proposal has been disclosed in German Patent Specification 20 48 588, where additional consideration must be paid to vibration problems affecting the entry portion, which automatically responds to changes to static pressure. This design also exhibits considerable complexity of mechanical design. Further, it will not permit control of the flow on the upper outer side of the shroud.

There is therefore needed a generic propfan turbine engine design which eliminates the hazard of flow separations in the presence of critical approach flow to the shroud.

This need is met by the present invention which includes a propfan turbine engine for aircraft having a shroud surrounding propfan blades including a leading edge of the shroud. The leading edge includes at least one separate profile part in an upper annular section. An actuating device is coupled to the at least one separate profile part to vary the separate profile part with respect to the shroud. A slot-like duct is formed between the upper annular section and the shroud when the separate profile part is in an extended position. The duct extends along an upward and rearward path.

An advantage of the present invention is provided in that air flow separations can safely be prevented by extending the profile part, or parts if one each is provided at the top and the bottom. As a result, an aircraft fitted with a propfan engine arranged in accordance with the present invention will tolerate wider angles of attack without risking flow separation on the nacelles, which in turn makes for improved flight safety under these critical conditions.

Another advantage is provided in that a generally axisymmetric outer shroud contour can be achieved and that an optimally low-drag, slim shroud contour is realized without necessarily allowing for the above-described off-design incidences. Another consideration is that the contour and geometry of the profile parts can be tailored to the following, especially critical cases of off-design incidence.

The duct created on the top side of the shroud when the profile part is extended is shaped such that the flow enters on the inside of the shroud, passes through the duct in a diagonally aft direction and sweeps the outside of the shroud. This effectively prevents flow separation from the top outer side.

The other duct formed on the lower side of the shroud, when the profile part is extended, is shaped such that the flow can enter from the outside and pass through the duct to eliminate the risk of separation from the bottom inner side of the shroud. The aft contours of the extendible profile parts accordingly are formed differently.

In a further aspect of the present invention the profile parts can pivot about a horizontal axis. For this purpose, one profile part is hinged at its circumferential ends to the shroud, with the actuating device acting on the center of one profile part.

This design provides an advantage in that it is much easier to mechanically manipulate that prior-art flaps or rings. Another advantage is provided in that the duct takes an approximately sinusoidal (i.e. half a sine wave) section corresponding to the desirable magnitude of pulse along the circumference to excite the flow. In this manner, therefore, an air stream distributed over the circumferential section of the profile part is generated, the flow rate of which corresponds to the local tendency for flow separation prevailing in the circumferential area affected.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic representation illustrating the inlet flow at high power and a large angle of attack.

FIG. 2 is a schematic representation illustrating the inlet flow at a low power and a large angle of attack.

FIG. 3 is an elevation view illustrating a turbine engine with extended profile parts.

FIG. 4 is an elevation view illustrating a forward portion of a shroud with retracted profile parts according to the present invention.

FIG. 5 is a front view illustrating the shroud of FIG. 4.

FIG. 6a is a diagrammatic representation of the duct area vs. swirl angle.

FIG. 6b is a representation of the angular relations.

FIG. 7 is a schematic longitudinal section of the shroud leading edge.

DETAILED DESCRIPTION OF THE DRAWINGS

Schematically shown in FIGS. 1 and 2 are the two especially critical cases that can be improved by the arrangement of the present invention.

Referring to FIG. 1, an engine at high power and with a large angle of attack $\beta$ is illustrated. The air flows along the direction of arrowhead 19 and into the shroud 2. This configuration will occur, e.g., during the takeoff of an aircraft. Two stagnation point lines 20a and 20b are curved outwardly, meaning that a large volume of air is ingested into the shroud 2. In this situation, the tendency of the air flow to separate becomes pronounced at the lower rim of the shroud 2, as is indicated by the arrow 21b. This air flow separation adversely affects the downstream fan as it may involve separation on the fan, impose high mechanical loads on the blades and additionally cause considerable noise. Therefore, air flow separation should be prevented at all costs.

The configuration shown in FIG. 2, where a large angle of attack $\beta$ exits while the engine idles or is dead, is also critical. The low volume of air flowing into the shroud 2 causes the stagnation point lines 20a and 20b to curve inwardly. In this case separation is imminent especially on the upper rim of the shroud 2 (arrow 21a). This separation may adversely affect the wing downstream and should, again, be prevented.

FIG. 3 illustrates a propfan turbine engine 1 including two propfan rotors 3a and 3b surrounded by a shroud 2. A flow duct 4 is divided downstream of the rear propfan rotor 3b into a bypass duct 5 and an inlet 6. The inlet duct 6 goes to the core engine 7 driving the propfan rotors 3a and 3b.

The core engine 7 essentially consists of an intermediate pressure compressor 8, a high-pressure compressor 9, a combustion chamber 10, a high-pressure turbine 11 coupled to the high-pressure compressor 9 by means of shafts (not shown in the drawing), and a low-pressure turbine 12 similarly coupled to the intermediate pressure compressor 8 and the two counterrotating propfan rotors 3a and 3b. In this arrangement, the low-pressure turbine 12 can optionally be either a counterrotating turbine coupled to the two propfan rotors 3a and 3b through two counterrotating shafts or a single low-pressure turbine 12 driving, through a single shaft, a gearbox which splits the turbine output between the two propfan rotors 3a and 3b.

The shroud 2 is connected to the core engine 7 through circumferentially spaced struts 13. The core engine 7 is mounted on the aircraft, especially on its wing, through mounting means 14, further details of which have been omitted in the drawing.

In accordance with the present invention, an annular profile part 16a or 16b is fitted along the leading edge 15 of the shroud 2 in at least one sector. The annular profile part can be displaced from the shroud 2 such that a duct 17a or 17b is formed between the profile part 16a or 16b and the shroud leading edge.

In a preferred embodiment, two profile parts 16a and 16b are fitted to the top and bottom of the shroud 2, respectively. It will be equally practicable, however, to fit such a profile part 16a or 16b to only the top or the bottom when, in the respective other region on account of other remedies or special geometries, little if any tendency to separate exists.

It is especially advantageous to form the profile parts 16a and 16b at the top as well as at the bottom, and to control them separately to prevent separation of the flow on the shroud 2. A control unit is provided which is driven by the flight conditions and engine parameters to extend or retract the profile parts 16a and 16b in response to these parameters. The control unit can be of any well known type operable in accordance with the teachings of the present invention.

The profile parts 16a and 16b can be moved along a direction, e.g., concentric with the engine centerline, by means of actuating devices 18a and 18b. The actuating devices 18a and 18b are preferably accommodated in the shroud 2 and are, for example, hydraulic actuators, spindles or other suitable devices.

FIG. 4 illustrates the arrangement of the present invention with the profile parts 16a and 16b being retracted into a position where they abut against the shroud 2. In this position, the ducts 17a and 17b, which are present in the extended position of the profile parts (FIG. 3), are closed.

In an essential aspect of the present invention, the ducts 17a and 17b are oriented in the plane of the drawing (FIG. 3) from the lower left corner towards the upper right corner to achieve the desired flow through the duct. In the corresponding FIG. 1, the case is illustrated by way of a pronounced angle of attack at high engine power, where the air approaches along a direction indicated by the arrow 19. The numerals 20a and 20b indicate in broken line the stagnation point lines, while the arrow 21b indicates the tendency for flow separation on the lower inner surface 23 of the shroud 2. FIG. 2 similarly illustrates a pronounced angle of attack at low engine power, with separation tendencies occurring on the upper outer surface 22 of the shroud 2 as indicated by the arrow 21a.

FIG. 5 is a front view showing the shroud 2 with the profile parts 16a and 16b being arranged in an upper sector 24 and a lower sector 25, respectively. The two sectors 24 and 25 each amount to about ¼ the circumference of the shroud 2. This creates an approximate angle of 45° with the horizontal direction. Depending on requirements, however, this angle may optionally be made smaller or larger.

The profile parts 16a and 16b are secured to the shroud 2 by means of hinges 26 attached to the circumferential ends 27 of the profile parts 16a and 16b. The actuating devices 18a, 18b (FIG. 3) act centrally on attachment points 28a and 28b of the profile parts 16a and 16b, respectively, with respect to their circumferential extent. This allows the curved profile parts to pivot about their hinge points when the actuating devices extend and retract. The hinges are preferably horizontally oriented pins which are carried on one side on the respective profile part 16a, 16b and on the other in the adjoining fixed leading edge sections 29a, 29b.

FIG. 6a is a diagrammatic representation on which the width "S" of duct 17 (FIG. 7) is plotted versus the circumferential angle $\phi$ (FIG. 5). The widths of duct 17 again varies with the angle $\alpha$ through which the profile parts 16a or 16b are pivoted relative to a normal line (FIG. 3 or FIG. 6b). The width of the duct is shown on the one hand for the upper profile part 16a by the angular range from 40° to 140°, and for the lower profile part 16b by the angular range from 220° to 320°. The legend on the ordinate depends on the selected inclination $\alpha$, where the concrete dimension of the duct width is obtained from:

$$S = tg\alpha \cdot R \cdot (\sin \phi - \sin \phi_o)$$

where $\alpha$ is the inclination of the deployed profile part 16a or 16b relative to the plane normal to the shroud axis, R is the radius of the shroud 2, $\phi$ the respective counterclockwise angle relative to horizontal, and $\phi_o$ the angle at which the hinges 26 are arranged. In FIG. 6a, $\phi_o = 45°$ is selected as an example, which means that the profile parts 16a and 16b extend over ¼ the circumference.

FIG. 6b shows the relationship for the duct width S which leads to the diagram shown in FIG. 6a, with the angular relations becoming apparent. Illustrated specifically are the maximum duct width $S_{90°}$, which coincides with the uppermost point of the shroud 2, and $S\phi$, which corresponds to the accordingly smaller width of the duct on both sides of this maximum.

FIG. 7 is a schematic longitudinal section of the upper portion of the leading edge 15 of the shroud 2. The profile part 16a is shown in the extended position.

In this position, the duct 17a is formed, its length being designated by the letter l and its width by the letter S. The duct width is about 1/5 to ⅓ the duct length l, which in turn is about 1.5 times the thickness d of the shroud. The duct 17a is preferably arched backwards in a bow fashion, which makes for good envelopment of the outer surface 22 of the shroud 2 by the flow.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A propfan turbine engine for aircraft having a shroud surrounding propfan blades, comprising:
   an annular leading edge of said shroud including a separate profile part forming an upper continuous annular section having an arc greater than 30° as a part of said leading edge;
   means for actuating coupled to said separate profile part to vary the position of said separate profile part with respect to said shroud;
   a single continuous annular slot-like duct formed between said profile part and said shroud when said separate profile part is in an extended position, wherein said profile part in the upper annular section and the leading edge of said shroud are designed such that the resulting slot-like duct extends along a radially outward and downstream path when viewed on its side pointing away from the leading edge.

2. A propfan turbine engine according to claim 1, wherein a second profile part is additionally formed in a lower annular section of the leading edge and wherein said actuating means is coupled to said second profile part.

3. A propfan turbine engine according to claim 2, wherein said second profile part in the lower annular section and the leading edge of said shroud are designed such that the resulting slot-like duct extends along a radially inward and downstream path on its side pointing away from the leading edge.

4. A propfan turbine engine according to claim 2, wherein said actuating means of the profile parts are operable independently of one another.

5. A propfan turbine engine according to claim 4, further comprising a control unit, coupled with the actuating means, driven by flight conditions and engine parameters to extend or retract said profile parts in response to these parameters.

6. A propfan turbine engine according to claim 1, wherein said profile part is pivotable about a horizontal axis.

7. A propfan turbine engine according to claim 5, wherein said profile parts are is pivotably attached at their circumferential ends to the shroud by means of hinges, and said actuating means acts centrally on the part.

8. A propfan turbine engine according to claim 7 wherein said hinge means include horizontal pins arranged such that one side of the pin is on said profile part and on the other side adjoins fixed leading edge sections.

* * * * *